US010904324B2

(12) United States Patent
Ishii et al.

(10) Patent No.: US 10,904,324 B2
(45) Date of Patent: Jan. 26, 2021

(54) COMPUTER SYSTEM AND METHOD OF CONTROLLING DATA PROCESSING

(71) Applicant: Hitachi, Ltd., Tokyo (JP)

(72) Inventors: Daisuke Ishii, Tokyo (JP); Kunihiko Toumura, Tokyo (JP); Yuji Ogata, Tokyo (JP)

(73) Assignee: HITACHI, LTD., Tokyo (JP)

(*) Notice: Subject to any disclaimer, the term of this patent is extended or adjusted under 35 U.S.C. 154(b) by 12 days.

(21) Appl. No.: 16/129,678

(22) Filed: Sep. 12, 2018

(65) Prior Publication Data
US 2019/0132384 A1    May 2, 2019

(30) Foreign Application Priority Data

Oct. 30, 2017    (JP) .................................. 2017-209825

(51) Int. Cl.
*H04L 29/08* (2006.01)
*H04W 4/38* (2018.01)

(52) U.S. Cl.
CPC ...... *H04L 67/1031* (2013.01); *H04L 67/1008* (2013.01); *H04L 67/322* (2013.01); *H04W 4/38* (2018.02)

(58) Field of Classification Search
CPC ............... H04L 67/1031; H04L 67/322; H04L 67/1008; H04W 4/38
See application file for complete search history.

(56) References Cited

U.S. PATENT DOCUMENTS 10,055,262 B1 *   8/2018   Thomas ................ G06F 9/5083
2017/0163724 A1 * 6/2017   Puri ....................... G06F 9/5083

FOREIGN PATENT DOCUMENTS

| JP | 2014-241119 A | * 12/2014 | ............... G06F 9/50 |
| JP | 2014241119 | * 12/2014 | ............... G06F 9/50 |
| WO | WO-2017-002729 A1 | 1/2017 | |

OTHER PUBLICATIONS

Haojin Wang, Telecommunications Network Management, 1999, McGraw-Hill ISBN 0-07-068170-8 (Year: 1999).*
ITU-T Recommendation E.412 (01/03), International network management—Network management controls (Year: 2003).*
JP_2014-241119_A __Eng_.pdf, Watari Yasuhiro, Processing System, and Information Processing Method, JP Patent Application No. 2013124179, Jun. 12, 2013 (Year: 2014).*

* cited by examiner

*Primary Examiner* — Philip C Lee
(74) *Attorney, Agent, or Firm* — Foley & Lardner LLP

(57) ABSTRACT

To reduce a load on a specific computer considering a load in association with an execution of data processing and an attribute of the data processing. A computer system executes data processing using collected data. The computer system includes a gateway configured to collect the data and a server coupled to the gateway. The data processing includes a plurality of processes. The server is configured to: manage an attribute of the data processing; monitor loads on the gateway and the server in association with the execution of the data processing; and execute process control processing whose object is reduction in the loads in association with the execution of the data processing based on the attribute of the data processing and monitoring results of the loads. The process control processing includes transfer processing configured to transfer the process and performance change processing configured to change a parameter configured to control performance of the process.

12 Claims, 13 Drawing Sheets

FIG.5

| PROCESS FLOW ID (401) | PROCESS ID (402) | CONTENTS (403) | PARAMETER (404) | INITIAL COMPUTER ID (405) | COMPUTER ID (406) |
|---|---|---|---|---|---|
| A | F1 | CONVERSION PROCESSING BINARY DATA→METADATA | — | G1 | S |
| | F3 | FILTERING | ·ITEM: NUMBER OF EXTRACTED DATA SETTING VALUE: 5, USUAL VALUE: 5, MINIMUM VALUE: 2, PITCH WIDTH: 1, | S | S |
| | F4 | SAMPLING | ·ITEM: SAMPLING RATE SETTING VALUE: 10 DATA PER SECOND, USUAL VALUE: 10 DATA PER SECOND, MINIMUM VALUE: ONE DATA PER SECOND, PITCH WIDTH: ONE DATA PER SECOND, | S | S |
| | F5 | ABNORMAL DETERMINATION PROCESSING | — | S | S |
| ... | ... | ... | ... | ... | ... |

| PROCESS FLOW ID | GATEWAY ID | PRIORITY | OPERATION FLAG | CONTROL FLAG |
|---|---|---|---|---|
| A | G1 | LOW | 1 | 0 |
| B | G1 | HIGH | 0 | 0 |
| C | G2 | LOW | 0 | 1 |
| D | G2 | HIGH | 0 | 0 |
| E | G3 | LOW | 1 | 1 |
| F | G3 | HIGH | 0 | 0 |

FIG.7

| PROCESS FLOW ID | LOAD INFORMATION | | | | LOAD VARIATION INFORMATION | | | |
| --- | --- | --- | --- | --- | --- | --- | --- | --- |
| | S | G1 | G2 | G3 | S | G1 | G2 | G3 |
| A | 18 % | 50 % | – | – | −0.1 | 0.1 | – | – |
| B | 12 % | 40 % | – | – | −0.2 | 0.2 | – | – |
| C | 15 % | – | 40 % | – | 0.5 | – | 0 | – |
| D | 10 % | – | 30 % | – | −1 | – | 0 | – |
| E | 12 % | – | – | 50 % | 0.5 | – | – | 0.1 |
| F | 10 % | – | – | 40 % | −0.8 | – | – | −0.2 |

COMPUTER SYSTEM AND METHOD OF CONTROLLING DATA PROCESSING

CLAIM OF PRIORITY

The present application claims priority from Japanese patent application JP 2017-209825 filed on Oct. 30, 2017, the content of which is hereby incorporated by reference into this application.

TECHNICAL FIELD

The present invention relates to a computer system that executes data processing using collected data and a method of controlling this data processing.

BACKGROUND ART

A service that analyzes data collected from a device such as a sensor to provide a value-added solution has been appearing in association with a development of IoT (Internet of Things).

A data processing system that achieves a collection of a large amount of various data, a data analysis, a data conversion of a data format into a data format usable by a work application that executes an improvement of work planning or similar processing, and a provision of the converted data at a low cost is demanded to this service.

Recently, there has been increasing a data processing system that has a system configuration including a plurality of edge computers located on a field and a server coupled to the plurality of edge computers in association with a spread of an edge computing technology. Here, the edge computing technology is technology that executes processing such as a data conversion by the edge computer such as a gateway located on a field such as a plant to achieve, for example, a reduction in a volume of communications with the server coupled over a network and real-time data processing.

When a customer's important matter or a work state is changed, the data processing needs to be changed. There has been known a method that joins a plurality of processes in any given order to achieve the data processing as a method to facilitate the change in the data processing. This ensures changing the data processing in unit of processes.

In the data processing system including the plurality of edge computers and the server, an increase in a load on a specific edge computer or the server in association with the change in the data processing possibly deteriorates the system performance or stops the system.

There has been known a technology described in Patent Literature 1 for the above-described problem. Patent Literature 1 describes that "In a node changing device 10, a sequence monitoring unit 12 acquires information (for example, a charging upper limit notification) indicative of a usage state of a node by a UE 90. A location calculating unit 14 changes the node executing request processing from the UE 90 from an edge 40 coupled to a RAN to a data center 70 based on the above-described charging upper limit notification. The processing is changed to the node in another network using the usage information; therefore, a balance between a cost and a speed can be held according to a degree of usage."

CITATION LIST

Patent Literature

Patent Literature 1: WO 2017/002729

SUMMARY OF INVENTION

Technical Problem

However, in the case where loads on both of edge computers and a server are high, even the use of the technology of Patent Literature 1 fails to reduce the load of data processing; therefore, there is a possibility that the system performance is deteriorated or the system stops.

Additionally, Patent Literature 1 is a technology that assumes only the specific data processing, the charging processing of a mobile communication terminal, and does not consider the configuration of the data processing, the requirements of the data processing, and the attribute of the data processing such as priority orders of the data processing. Accordingly, the technology of Patent Literature 1 is inapplicable to a data processing system that executes various kinds of data processing as it is.

For example, there may be a case that the IoT cannot handle data such as alarm data where a loss of the data is inacceptable. When a process is transferred between the edge computer and the server, since the data processing needs to be halted until the completion of the process transfer, the halt of the data processing possibly loses the collected data without being processed. Accordingly, the technology of Patent Literature 1 cannot achieve the reduction in the load of the data processing while satisfying the requirements for the data processing.

An object of the present invention is to provide a system and a method that achieve a control of data processing that avoids a load of the data processing to concentrate on a specific edge computer or a server considering the load of the data processing and an attribute of the data processing.

Solution to Problem

One typical example of the invention disclosed in this application is as follows. That is, a computer system executes data processing using collected data. The computer system includes a gateway configured to collect the data and a server coupled to the gateway. The data processing includes a plurality of processes. The gateway and the server are each configured to execute at least one process. The server is configured to: manage an attribute of the data processing; monitor loads on the gateway and the server in association with the execution of the data processing; and execute a process control processing whose object is reduction in the loads in association with the execution of the data processing based on the attribute of the data processing and monitoring results of the loads. The process control processing includes transfer processing and performance change processing. The transfer processing is configured to transfer the process between the gateway and the server. The performance change processing is configured to change a parameter. The parameter is configured to control performance of the process.

Advantageous Effects of Invention

With the present invention, a reduction in a load of data processing considering a load on a computer and an attribute of data processing can be achieved. An object, configurations, and effects other than the above-described ones are made clear by the following description of embodiments.

BRIEF DESCRIPTION OF DRAWINGS

FIG. 5 is a drawing illustrating one example of process flow configuration information of the first embodiment.

FIG. 6 is a drawing illustrating one example of process flow requirement information of the first embodiment.

FIG. 7 is a drawing illustrating one example of process flow load information of the first embodiment.

DESCRIPTION OF EMBODIMENTS

Figure 1:
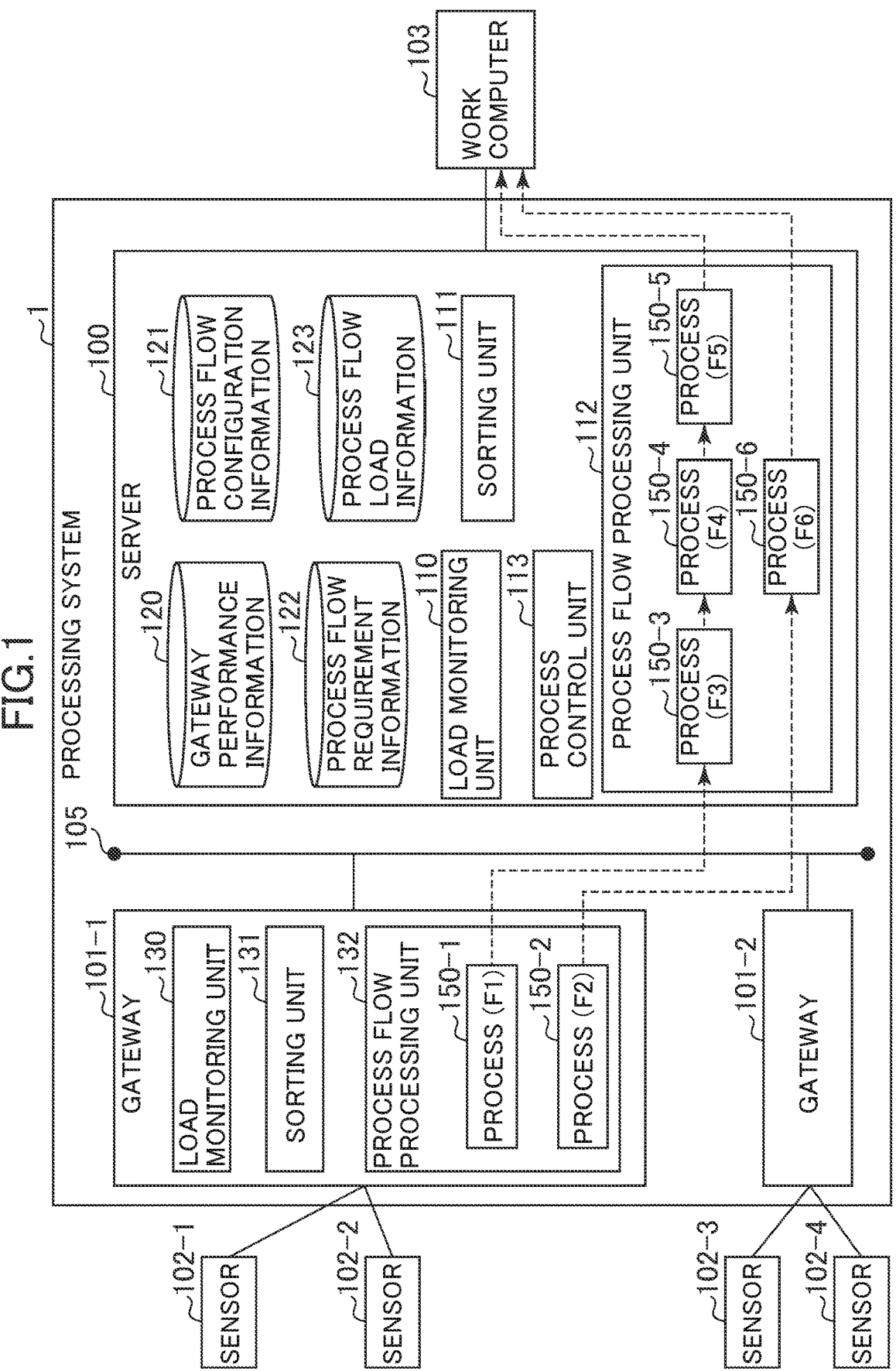
FIG. 1 is a drawing illustrating a configuration example of an entire system of a first embodiment.

The following describes embodiments of the present invention with reference to the drawings. However, the present invention is not interpreted limited to the contents of the description of the embodiments described below. It will be easily understood for those skilled in the art that changes in its specific configuration are possible without departing from the thought and the technical scope of the present invention.

Like reference numerals designate identical or similar configurations or functions in the following description, and therefore such elements will not be further elaborated here.

First Embodiment

Figure 2:
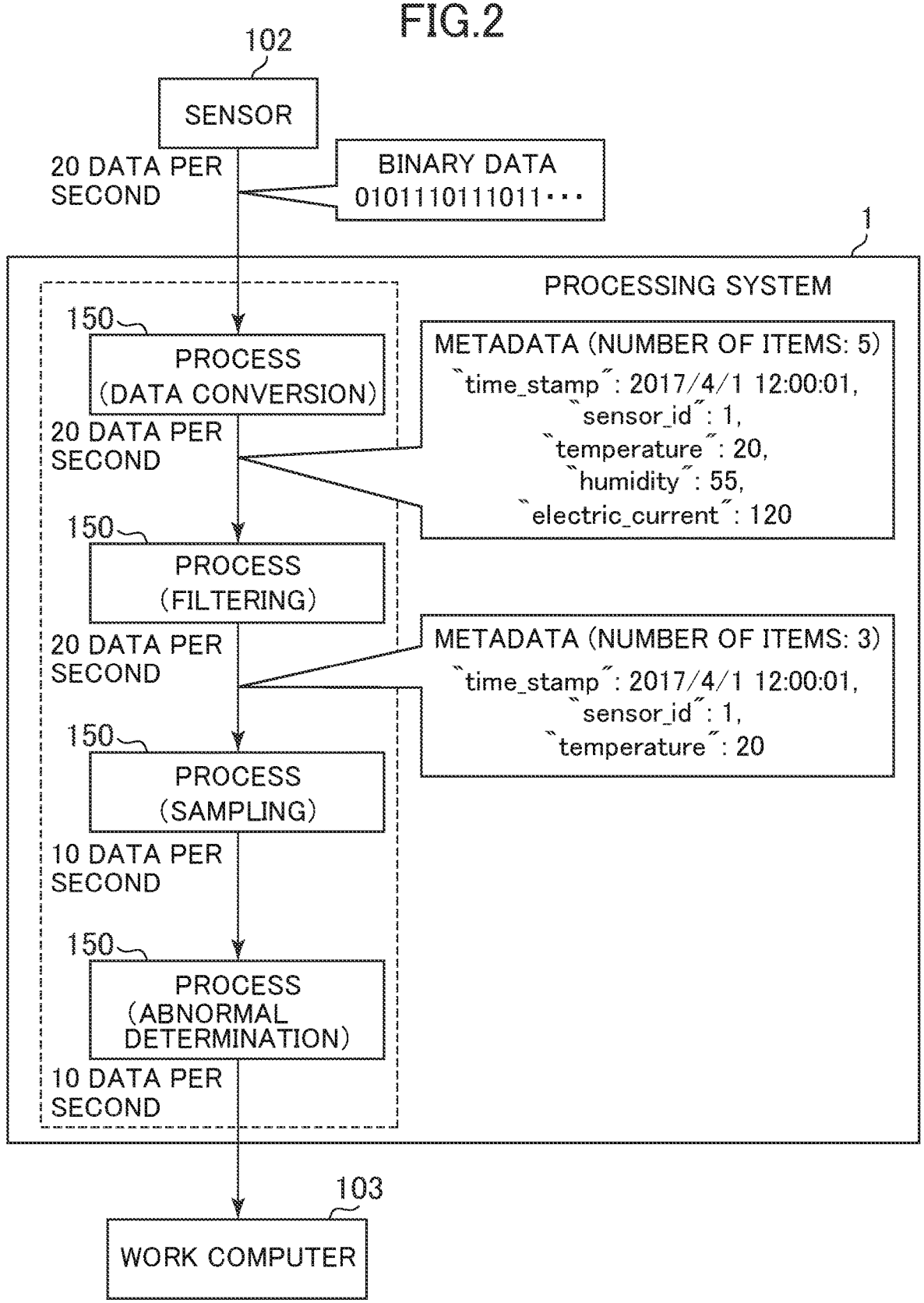
FIG. 2 is a drawing illustrating a configuration example of data processing of the first embodiment.

FIG. 1 is a drawing illustrating a configuration example of an entire system of the first embodiment. FIG. 2 is a drawing illustrating a configuration example of data processing of the first embodiment.

The system includes a data processing system 1, a plurality of sensors 102-1, 102-2, 102-3, and 102-4, and a work computer 103.

The plurality of sensors 102-1, 102-2, 102-3, and 102-4 and the work computer 103 are coupled to the data processing system 1. The data processing system 1 includes a server 100 and a plurality of gateways 101-1 and 101-2. The server 100 and the plurality of gateways 101-1 and 101-2 are coupled to one another over a network 105.

The network 105 is a WAN (Wide Area Network), a LAN (Local Area Network), or a similar network, and both of wireless and wired connections may be used as the connection system.

When not distinguished, the sensors 102-1, 102-2, 102-3, and 102-4 are referred to as a sensor 102 in the following description. When not distinguished, the gateways 101-1 and 101-2 are referred to as a gateway 101.

The data processing system 1 collects data from the sensor 102, executes data processing using this data, and transmits a processing result to the work computer 103 on which a work application operates.

As illustrated in FIG. 2, the data processing includes a plurality of processes 150 joined in an execution order for ensuring flexible handling for, for example, an addition and a change of processing. The process 150 is achieved by executing a program (an application) that achieves any given function. In the following description, the collection of the processes 150 achieving the data processing is also referred to as a process flow.

FIG. 2 illustrates a process flow to determine an abnormality of a state of an observation target. When receiving 20 pieces of binary data as sensor data in one second from the sensor 102, the data processing system 1 executes the data conversion process 150, the filtering process 150, the sampling process 150, and the abnormal determination process 150 and transmits the determination results to the work computer 103.

The data conversion process 150 converts binary data into metadata. The filtering process 150 extracts metadata meeting conditions. The sampling process 150 downsamples the metadata. Here, 20 pieces of metadata in one second are downsampled to 10 pieces metadata in one second. The abnormal determination process 150 analyzes the metadata and determines whether the state of the observation target is normal or not based on the analysis result.

In this embodiment, the plurality of processes 150, which constitute the process flow, are dispersively located on the server 100 and the gateway 101. FIG. 1 illustrates a connection relationship of the processes 150 constituting the process flow by the dotted lines. That is, the data processing system 1 executes a process flow including the process 150 group with identification information "F1," "F3," "F4," and "F5" and a process flow including the process 150 group with identification information "F2" and "F6."

In this embodiment, the one gateway 101 and the server 100 execute the one process flow. That is, the processes 150 located at the respective gateways 101 constitute different process flows.

A process flow that handles one sensor data as an input may be defined and a process flow that handles the plurality of sensors data as inputs may be defined. When the process flow handling the one sensor data as the input is defined, the number of sensors 102 becomes identical to the number of process flows.

The sensor 102 acquires measured values from the observation target at constant intervals and transmits sensor data including the measured values to the gateway 101. The sensor 102 is, for example, a sensing device such as a temperature sensor, a humidity sensor, a vibration sensor, and a camera and a sensor such as a monitoring sensor including these sensors. While the two sensors 102 are coupled to the one gateway 101 in FIG. 1, the present invention not limited to this. The number of sensors 102 coupled to the one gateway 101 may be one or may be three or more.

The gateway 101 is a computer functioning as an edge computer that collects the sensor data from the sensor 102, executes the process 150 using the sensor data, and transmits the sensor data or the processing result to the server 100. In this embodiment, the gateway 101 executes the one or more processes 150 constituting the process flow corresponding to the data processing. The gateway 101 can execute the one or more processes 150 constituting the different process flows.

The gateway 101 includes a load monitoring unit 130, a sorting unit 131, and a process flow processing unit 132.

The load monitoring unit 130 monitors a load on the gateway 101. For example, the load monitoring unit 130 monitors a usage rate of an arithmetic device 210 (see FIG. 3) as the load on the gateway 101. Here, the load on the gateway 101 represents the load in association with the execution of all process flows related to the gateway 101. This embodiment monitors the load in units of process flows to facilitate an estimation of the load on the gateway 101. The load in units of process flows indicates a load caused by the process 150 constituting the process flow.

In the following description, the load in units of process flows is also referred to as a process flow load. This embodiment calculates the summed value of the process flow loads on the gateway 101 as the load on the gateway 101.

Periodically or when receiving a transmission instruction from the server 100, the load monitoring unit 130 transmits the monitoring result of the load. The monitoring result of the load includes the monitoring result of the process flow load.

The sorting unit 131 sorts these sensor data based on, for example, the type of the received sensor data and inputs the sensor data to the appropriate processes 150 (process flows).

The process flow processing unit 132 executes the process 150 using the sensor data and transmits the processing result to the server 100.

The server 100 receives the sensor data or the processing result from the gateway 101, executes the process 150 using the sensor data or the processing result, and transmits the processing result to the work computer 103. In this embodiment, the server 100 executes the one or more processes 150 constituting the process flow corresponding to the data processing. The server 100 can execute the one or more processes 150 constituting the different process flows.

The server 100 includes a load monitoring unit 110, a sorting unit 111, a process flow processing unit 112, and a process control unit 113. The server 100 holds gateway performance information 120, process flow configuration information 121, process flow requirement information 122, and process flow load information 123.

The load monitoring unit 110 monitors the load on the server 100. For example, the load monitoring unit 110 monitors a usage rate of an arithmetic device 200 (see FIG. 3) as the load on the server 100. Here, the load on the server 100 represents the load in association with the execution of all process flows related to the server 100. This embodiment monitors the load in units of process flows to facilitate an estimation of the load on the server 100. This embodiment calculates the summed value of the process flow loads on the server 100 as the load on the server 100.

The sorting unit 111 sorts the sensor data or the processing results based on, for example, identification information of the gateway 101 as the transmission source of the sensor data or the processing results and the type of the received sensor data or processing results and inputs the data or the results to the appropriate processes 150 (process flows).

The process flow processing unit 112 executes the process 150 using the data received from the gateway 101 and transmits the processing result to the work computer 103.

The process control unit 113 controls the locations of the processes 150 and the contents of the processes 150 based on, for example, the loads on the server 100 and the gateway 101 and the attribute of the process flow. Here, the attribute of the process flow (the attribute of the data processing) indicates the configuration of the process flow, the requirement of the process flow, and a similar attribute. The requirement of the process flow (the requirement of the data processing) indicates the priority of the process flow, the property of the process flow, and a similar requirement.

The gateway performance information 120 is information to manage the performance of the gateway 101. This embodiment manages the performance of the gateway 101 based on a difference in performance between the server 100 and the gateway 101. The following describes details of the gateway performance information 120 with reference to FIG. 4.

The process flow configuration information 121 is information to manage the configuration of the process flow. The following describes details of the process flow configuration information 121 with reference to FIG. 5.

The process flow requirement information 122 is information to manage the requirement of the process flow. The following describes details of the process flow requirement information 122 with reference to FIG. 6.

The process flow load information 123 is information to manage the load on the data processing system 1 in association with the execution of the process flow. The following describes details of the process flow load information 123 with reference to FIG. 7.

Figure 3:
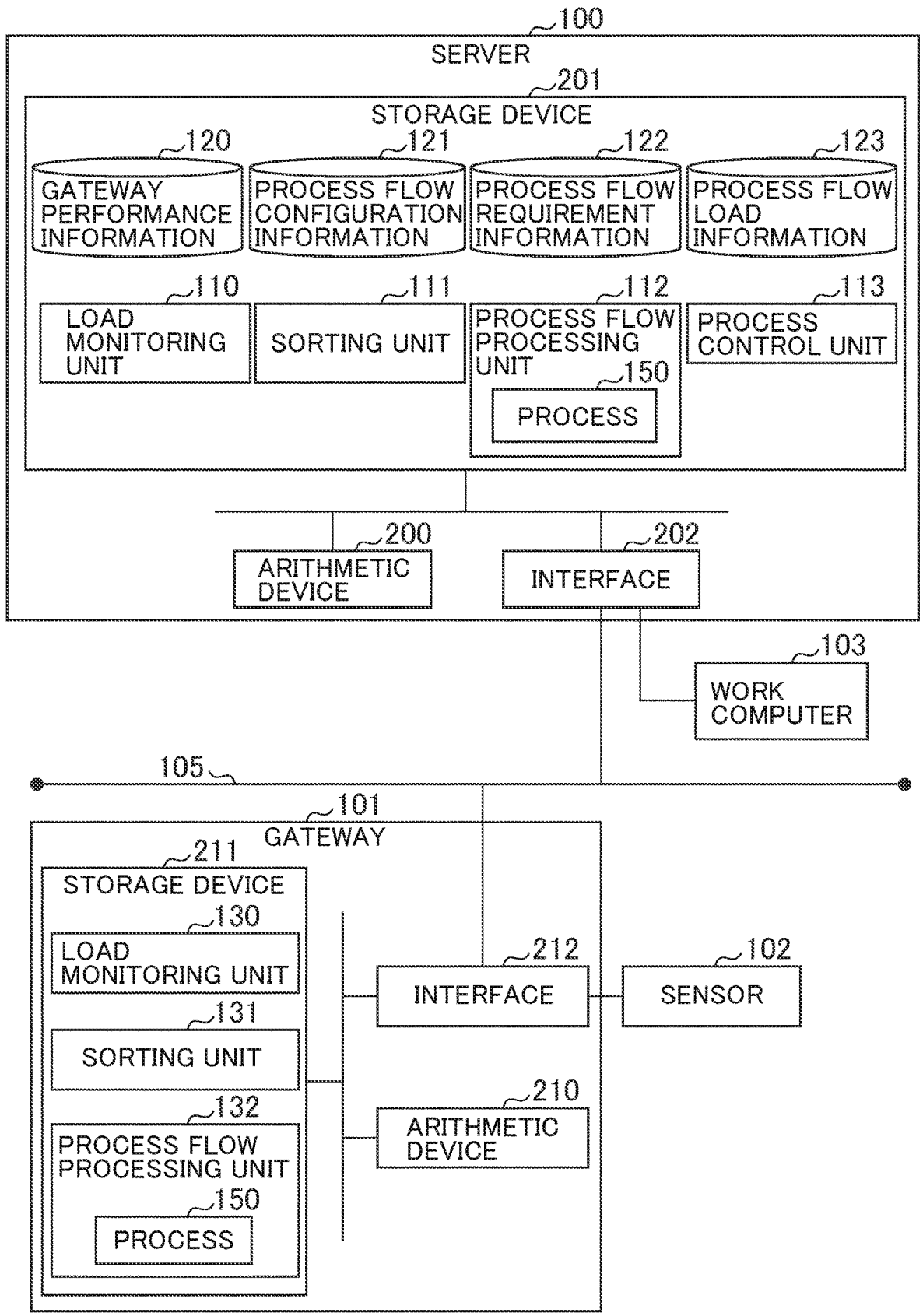
FIG. 3 is a drawing illustrating one example of a hardware configuration of devices included in a data processing system of the first embodiment.

FIG. 3 is a drawing illustrating one example of a hardware configuration of the computers included in the data processing system 1 of the first embodiment.

The server 100 includes the arithmetic device 200, a storage device 201, and an interface 202. The server 100 may include input devices such as a keyboard, a computer mouse, and a touch panel and an output device such as a display.

The arithmetic device 200 is a device, for example, a CPU (Central Processing Unit) and an FPGA (Field Programmable Gate Array), that executes a program stored in the storage device 201. The arithmetic device 200 executes the processing in accordance with the program to operate as a functional unit (a module) achieving a predetermined function. When the following describes processing with the functional unit as a subject, this suggests that the arithmetic device 200 executes the program achieving this functional unit.

Regarding the respective functional units that the server 100 includes, the plurality of functional units may be integrated into one functional unit or the one functional unit may be divided into the plurality of functional units.

The storage device 201 is a device, for example, a memory, an HDD (Hard Disk Drive), an SSD (Solid State Drive), a RAM (Random Access Memory), and a ROM (Read Only Memory) that stores the program executed by the arithmetic device 200 and information used by this program. The storage device 201 includes a work area temporarily used for the program.

The storage device 201 of this embodiment stores the programs achieving the load monitoring unit 110, the sorting unit 111, the process flow processing unit 112, and the process control unit 113. The storage device 201 of this embodiment stores the programs achieving the processes 150. Furthermore, the storage device 201 of this embodiment stores the gateway performance information 120, the process flow configuration information 121, the process flow requirement information 122, and the process flow load information 123.

The interface 202 is a device, for example, an I/O interface and a network interface coupled to an external computer.

A logical connection relationship of the server 100 is as follows. The load monitoring unit 110 and the process control unit 113 can access the gateway performance information 120, the process flow configuration information 121, the process flow requirement information 122, and the process flow load information 123. The load monitoring unit 110 and the process flow processing unit 112 can communicate with one another. The sorting unit 111 and the process flow processing unit 112 can communicate with one another. The sorting unit 111 and the process control unit 113 can communicate with one another. The process flow processing unit 112 can communicate with the work application. The process control unit 113 can communicate with the process flow processing unit 132.

While the load monitoring unit 110, the sorting unit 111, the process flow processing unit 112, and the process control unit 113 are achieved as the programs in this embodiment, the configuration is not limited to this. The load monitoring unit 110, the sorting unit 111, the process flow processing unit 112, and the process control unit 113 may be achieved using dedicated hardware. In this case, the load monitoring unit 110 monitors the load on the hardware achieving the process flow processing unit 112.

The gateway 101 includes the arithmetic device 210, a storage device 211, and an interface 212. The arithmetic device 210, the storage device 211, and the interface 212 are identical to the arithmetic device 200, the storage device 201, and the interface 202.

The storage device 211 of this embodiment stores the programs achieving the load monitoring unit 130, the sorting unit 131, and the process flow processing unit 132, and the programs achieving the processes 150.

A logical connection relationship of the gateway 101 is as follows. The sorting unit 131 can communicate with the sensor 102. The sorting unit 131 and the process flow processing unit 132 can communicate with one another. The load monitoring unit 110 can communicate with any of the load monitoring unit 110 and the process control unit 113 in the server 100.

While the load monitoring unit 130, the sorting unit 131, and the process flow processing unit 132 are achieved as the programs in this embodiment, the configuration is not limited to this. The load monitoring unit 130, the sorting unit 131, and the process flow processing unit 132 may be achieved using dedicated hardware. In this case, the load monitoring unit 130 monitors the load on the hardware achieving the process flow processing unit 132.

While this embodiment uses the physical server 100 and gateway 101, virtual computers having similar functions may be used.

Next, the following describes details of the information held by the server 100.

Figure 4:
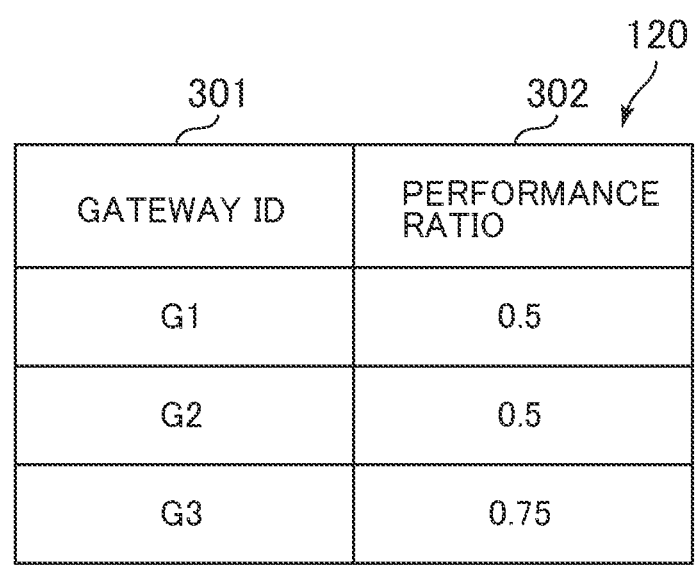
FIG. 4 is a drawing illustrating one example of gateway performance information of the first embodiment.

FIG. 4 is a drawing illustrating one example of the gateway performance information 120 of the first embodiment.

The gateway performance information 120 includes entries including gateway IDs 301 and performance ratios 302. One entry corresponds to the one gateway 101.

The gateway ID 301 is a field storing identification information of the gateway 101. The identification information of the gateway 101 may be an IP address and any given input value. The identification information of the gateway 101 may be set automatically or manually. The gateway performance information 120 illustrated in FIG. 4 includes the entries of the gateways 101 with the identification information "G1," "G2," and "G3."

The performance ratio 302 is a field storing a performance value of the gateway 101 when the performance value of the server 100 is defined as "1." An administrator of the data processing system 1 sets the performance value based on, for example, the performance of the arithmetic device, the storage capacity of the storage device, and a result of a benchmark test.

FIG. 5 is a drawing illustrating one example of the process flow configuration information 121 of the first embodiment.

The process flow configuration information 121 includes entries including process flow IDs 401, process IDs 402, contents 403, parameters 404, initial computer IDs 405, and computer IDs 406. One entry corresponds to the one process flow.

The process flow ID 401 is a field storing the identification information of the process flow. The identification information of the process flow is, for example, automatically or manually set at the setting of the process flow. The entry corresponding to the one process flow includes rows by the number of processes 150 constituting the process flow.

The process ID 402 is a field storing the identification information of the processes 150 constituting the process flow. The identification information of the process 150 is, for example, automatically or manually set at the setting of the process flow. The identification information of the process 150 is set in order from the top in accordance with the execution order. In the example illustrated in FIG. 5, the process 150 with the identification information "F1" executed first is set to the top row, and the process 150 with the identification information "F5" executed last is set to the bottom row.

The contents 403 are a field storing the type, the contents, and similar information of the process 150. The type, the contents, and similar information of the process 150 are, for example, automatically or manually set at the setting of the process flow.

The parameter 404 is a field storing parameters to control the performance of the processes 150. The parameter 404 of the process 150 where a changeable parameter is absent or the parameter 404 of the process 150 whose parameter is not changeable becomes a blank.

The parameter 404 of the process 150 where the changeable parameter is present stores an item, a setting value, a usual value, a minimum value, a pitch width, and a similar parameter. The item is the identification information of the target parameter. The setting value is a currently set value. The usual value is an initial value provided at the setting of the process flow and is a value before being changed in association with the increase in the load. The minimum value is the minimum value of the settable parameter. The pitch width is a pitch width for the value change.

The initial computer ID 405 and the computer ID 406 are fields storing the identification information of the device that executes the process 150 corresponding to the process ID 402. The initial computer ID 405 and the computer ID 406 store the identification information of any of the server 100 and the gateway 101. "S" indicates the identification information of the server 100.

The initial computer ID 405 stores the identification information of the computer at which the process 150 is located at the setting of the process flow. The computer ID 406 stores the identification information of the computer where the process 150 is currently located. At the setting of the process flow, the identical identification information is set to the respective rows of the initial computer IDs 405 and the computer IDs 406.

FIG. 5 illustrates the entries of the process flow including the processes 150 with the identification information "F1," "F3," "F4," and "F5" as one example.

FIG. 6 is a drawing illustrating one example of the process flow requirement information 122 of the first embodiment.

The process flow requirement information 122 includes entries including process flow IDs 501, gateway IDs 502, priorities 503, operation flags 504, and control flags 505. One entry corresponds to one process flow.

The process flow ID 501 is a field identical to the process flow ID 401.

The gateway ID 502 is a field storing the identification information of the gateway 101 executing the process 150 constituting the process flow. That is, the gateway ID 502 stores the identification information of the gateway 101 related to the process flow.

The priority 503 is a field storing the priority indicative of an importance of the process flow (the data processing). In this embodiment, the priority 503 is used as a selection criterion for the above-described data processing targeted by process control processing described later. The priority 503 of this embodiment stores any of "high" and "low." "High" indicates the high priority and "low" indicates the low priority. The server 100 of this embodiment controls such that the process flow with high priority is not changed as much as possible.

The process flow with low priority includes a process flow performing a temperature monitoring. The process flow with high priority includes a process flow performing an abnormal detection.

The priority 503 may store a value. For example, the value is stored with "1" defined as the highest priority.

The operation flag 504 is a field storing a flag indicative of whether the process flow has been changed or not. Here, the process flow change indicates the transfer of the process 150 between the server 100 and the gateway 101 or the parameter change of the process 150. The operation flag 504 stores any of "0" and "1." "0" indicates that the process flow is not changed and "1" indicates that the process flow has been changed.

The control flag 505 is a field storing information indicative of the requirements of the data processing, namely, the process flow. The control flag 505 of this embodiment stores a flag indicative of whether or not the loss of data caused by the control of the process flow, that is, the transfer of the process 150 constituting the process flow between the server 100 and the gateway 101 is permitted. The control flag 505 stores any of "0" and "1." "0" indicates that the loss of data caused by the transfer of the process 150 is not permitted, and "1" indicates that the loss of data caused by the transfer of the process 150 is permitted.

Assume that the administrator of the data processing system 1 sets the control flag 505. Note that the control flag 505 can be changed at any timing.

FIG. 7 is a drawing illustrating one example of the process flow load information 123 of the first embodiment.

The process flow load information 123 includes entries including process flow IDs 601, load information 602, and load variation information 603. One entry indicates the one process flow.

The process flow ID 601 is a field identical to the process flow ID 401.

The load information 602 is a field storing the current process flow loads on the server 100 and the gateway 101.

The load information 602 includes rows corresponding to the server 100 and all gateways 101 included in the data processing system 1.

The load variation information 603 is a field storing values indicative of variation trends of the process flow loads on the server 100 and the gateways 101.

The load variation information 603 of this embodiment stores values (change values) indicative of variation trends of usage rates of the arithmetic devices 200 and 210 in a time range of a constant time period up to the present. For example, the load variation information 603 stores values calculated using the time range and variations of the usage rate. The time range can be set to, for example, five minutes. As the value closes to "0," this indicates that the usage rates of the arithmetic devices 200 and 210 do not change, that is, the loads on the arithmetic devices 200 and 210 are constant.

The process flow load information 123, for example, is updated as follows. The load monitoring unit 110 updates the load information 602 based on the monitoring results of the process flow loads on the server 100 and the gateway 101 and the process flow configuration information 121. The load monitoring unit 110 calculates the change value based on logs of the process flow loads. Furthermore, the load monitoring unit 110 updates the load variation information 603 based on this change value and the process flow configuration information 121.

Figure 8:
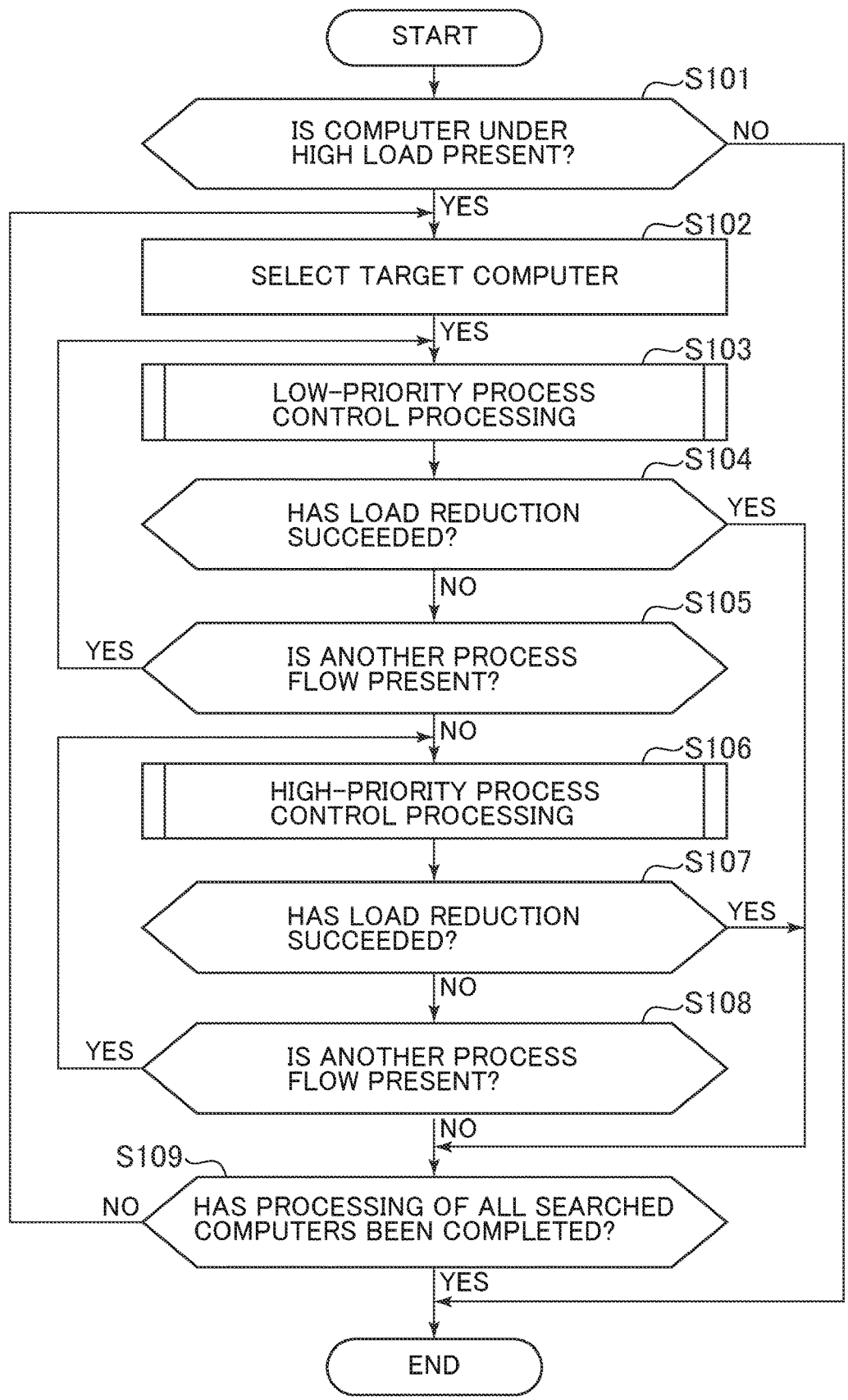
FIG. 8 is a flowchart describing one example of process control processing executed by a server of the first embodiment.

FIG. 8 is a flowchart describing one example of the process control processing executed by the server 100 of the first embodiment. The process control unit 113 starts the processing described in the following periodically or when accepting an execution instruction from the administrator.

The process control unit 113 refers to the process flow load information 123 and determines whether a computer under a high load is present or not (Step S101).

Specifically, the process control unit 113 refers to the load information 602 in the process flow load information 123 and calculates the summed values of the process flow loads on the respective devices. Furthermore, the process control unit 113 searches a computer where the calculated summed value of the process flow load is a threshold or more. The process control unit 113 creates a list of the searched computers. It is assumed that the threshold has been preliminarily set. However, the threshold can be appropriately updated.

In the example illustrated in FIG. 7, the summed value of the usage rate (the process flow load) of the arithmetic device 200 in the server 100 is calculated as 77%. The summed value of the usage rate (the process flow load) of the arithmetic device 210 in the gateway 101 with the identification information "G1" is calculated as 90%. The usage rate (the process flow load) of the arithmetic device 210 in the gateway 101 with the identification information "G2" is calculated as 70%. The usage rate (the process flow load) of the arithmetic device 210 in the gateway 101 with the identification information "G3" is calculated as 90%. With 80% set to the threshold, the gateway 101 with the identification information "G1" and the gateway 101 with the identification information "G3" are searched as the computers under the high load.

When determining that the computer under the high load is absent (NO at Step S101), the process control unit 113 terminates the process control processing.

When determining that the computer under the high load is present (YES at Step S101), the process control unit 113 selects a target computer among the searched computers (Step S102).

Specifically, the process control unit 113 selects the target computer from the list of the computers created at Step S101. At this time, the process control unit 113 deletes the target computer from the list. The process control unit 113, for example, selects the target computer in the order of large load. The above-described selection method is one example, and the method of the present invention is not limited to this.

Next, the process control unit 113 executes low-priority process control processing targeting the process flow (the data processing) related to the target computer and the process flow (the data processing) with the priority 503 of "low" (Step S103). The following describes details of the low-priority process control processing with reference to FIG. 9A.

After the low-priority process control processing has been completed, the process control unit 113 determines whether the reduction in the load on the target computer has succeeded or not based on the result of the low-priority process control processing (Step S104).

When determining that the reduction in the load on the target computer has succeeded (YES at Step S104), the process control unit 113 advances processing to Step S109.

When determining that the reduction in the load on the target computer has failed (NO at Step S104), the process control unit 113 determines whether an unprocessed process flow with the priority 503 of "low" is present or not (Step S105).

Specifically, the process control unit 113 determines whether or not the list of the process flows created at the low-priority process control processing is blank. When the list of the process flows is blank, the process control unit 113 determines that the unprocessed process flow with the priority 503 of "low" is absent.

When determining that the unprocessed process flow with the priority 503 of "low" is present (YES at Step S105), the process control unit 113 returns processing to Step S103 and executes the similar processing.

When determining that the unprocessed process flow with the priority 503 of "low" is absent (NO at Step S105), the process control unit 113 executes high-priority process control processing targeting the process flow (the data processing) related to the target computer and the process flow (the data processing) with the priority 503 of "high" (Step S106). The following describes details of the high-priority process control processing with reference to FIG. 9B.

After the high-priority process control processing has been completed, the process control unit 113 determines whether the reduction in the load on the target computer has succeeded or not based on the result of the high-priority process control processing (Step S107).

When determining that the reduction in the load on the target computer has succeeded (YES at Step S107), the process control unit 113 advances processing to Step S109.

When determining that the reduction in the load on the target computer has failed (NO at Step S107), the process control unit 113 determines whether the unprocessed process flow with the priority 503 of "high" is present or not (Step S108).

Specifically, the process control unit 113 determines whether the list of the process flows created at the high-priority process control processing is blank or not. When the list of the process flows is blank, the process control unit 113 determines that the unprocessed process flow with the priority 503 of "high" is absent.

When determining that the unprocessed process flow with the priority 503 of "high" is present (YES at Step S108), the process control unit 113 returns processing to Step S106 and executes the similar processing.

When determining that the unprocessed process flow with the priority 503 of "high" is absent (NO at Step S108), the process control unit 113 advances processing to Step S109.

At Step S109, the process control unit 113 determines whether the processing of all computers searched at Step S101 has been completed or not (Step S109).

When determining that the processing of all computers searched at Step S101 has not been completed (NO at Step S109), the process control unit 113 returns processing to Step S102 and executes the similar processing.

When determining that the processing of all computers searched at Step S101 has been completed (YES at Step S109), the process control unit 113 terminates the process control processing.

Figure 9A:
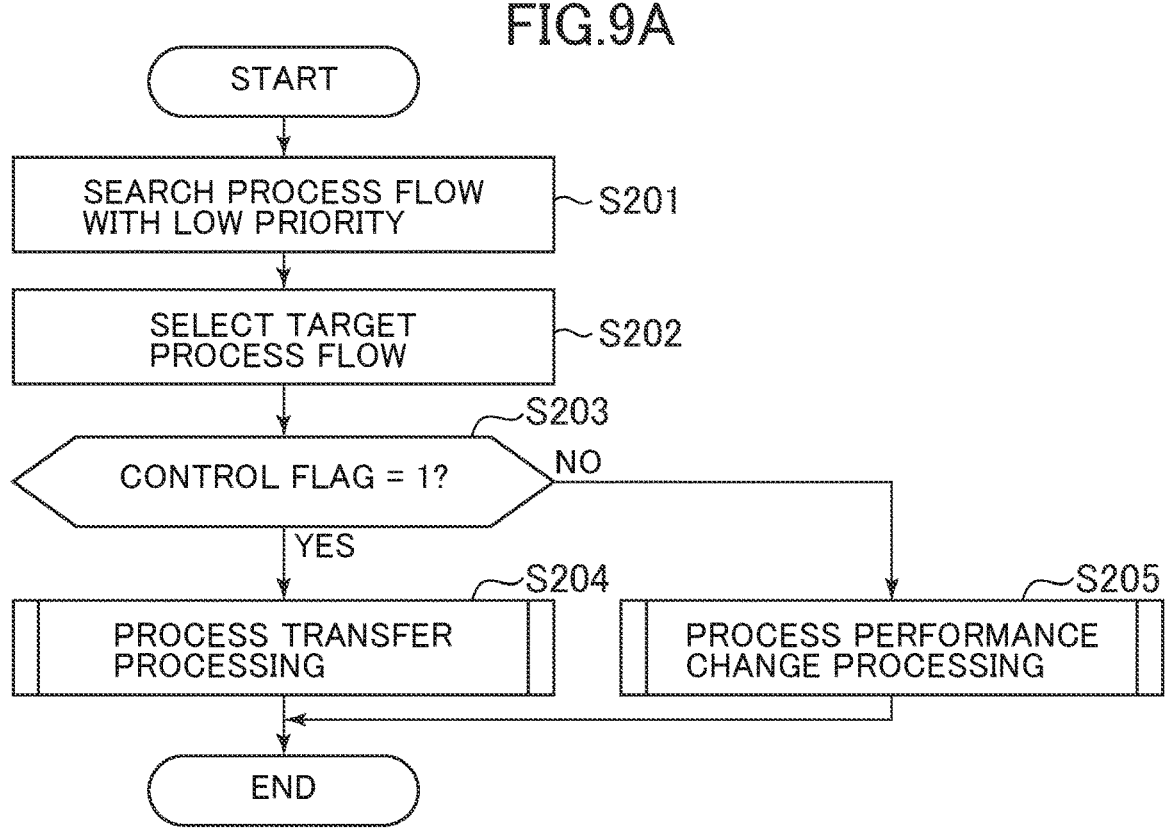
FIG. 9A is a flowchart describing one example of low-priority process control processing executed by a process control unit of the first embodiment.
Figure 9B:
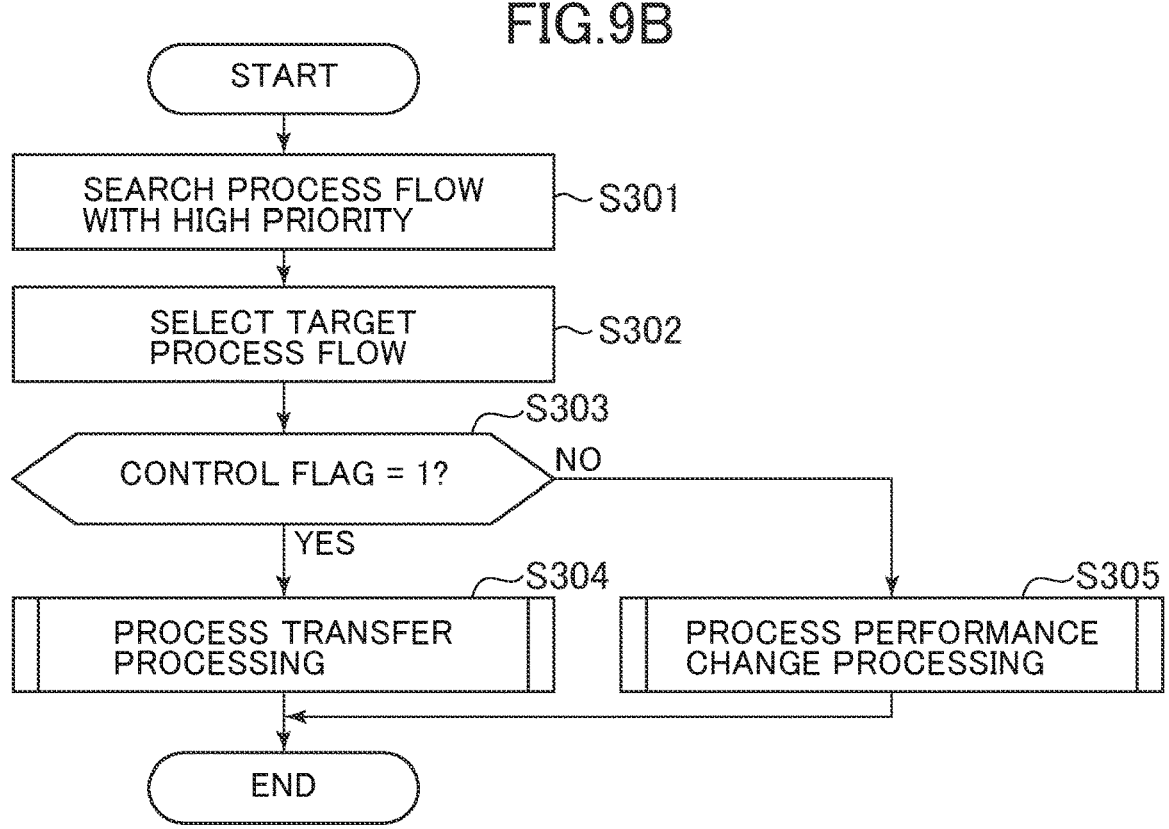
FIG. 9B is a flowchart describing one example of process control high-priority process control processing executed by the process control unit of the first embodiment.

FIG. 9A is a flowchart describing one example of the low-priority process control processing executed by the process control unit 113 of the first embodiment. FIG. 9B is a flowchart describing one example of the high-priority process control processing executed by the process control unit 113 of the first embodiment.

First, the following describes the low-priority process control processing with reference to FIG. 9A.

The process control unit 113 searches a process flow with a low priority among the process flows related to the target computer (Step S201).

Specifically, the process control unit 113 refers to the process flow configuration information 121 and identifies a process flow where the identification information of the target computer is set to the computer ID 406. Furthermore, the process control unit 113 refers to the process flow requirement information 122 and searches a process flow with the priority 503 of "low" among the entries in which the identification information of the process flow identified at the process flow ID 501 is stored. The process control unit 113 creates a list of the searched process flows.

Next, the process control unit 113 selects a target process flow among the searched process flows (Step S202).

Specifically, the process control unit 113 selects the target process flow from the created list. At this time, the process control unit 113 deletes the target process flow from the list. The selection method of the target process flow includes a method such as a method of selecting the target process flow in an order registered with the list.

Next, the process control unit 113 determines whether the loss of data caused by the transfer of the process 150 is permitted or not (Step S203).

Specifically, the process control unit 113 refers to the process flow requirement information 122 and determines whether the control flag 505 in the entry corresponding to the target process flow is "1" or not. When the control flag 505 is "1," the process control unit 113 determines that the loss of data caused by the transfer of the process 150 is permitted.

When determining that the loss of data caused by the transfer of the process 150 is permitted (YES at Step S203), the process control unit 113 executes the process transfer processing (Step S204) and then terminates the low-priority process control processing.

The process transfer processing is processing that transfers the process 150 between the server 100 and the gateway 101 to reduce the load on the target computer. The following describes details of the process transfer processing with reference to FIG. 10. The process transfer processing sets the process 150 constituting the target process flow as a transfer target.

When determining that the loss of data caused by the transfer of the process 150 is not permitted (NO at Step S203), the process control unit 113 executes process performance change processing (Step S205), and then terminates the low-priority process control processing.

The process performance change processing is processing that changes a parameter controlling the performance of the process 150 to reduce the load on the target computer. The following describes details of the process performance change processing with reference to FIG. 11. The process performance change processing sets the parameter of the process 150 constituting the target process flow as a change target.

Next, the following describes the high-priority process control processing with reference to FIG. 9B.

The process control unit 113 searches a process flow with the high priority among the process flows related to the target computer (Step S301).

Specifically, the process control unit 113 refers to the process flow configuration information 121 and identifies a process flow where the identification information of the target computer is set to the computer ID 406. Furthermore, the process control unit 113 refers to the process flow requirement information 122 and searches a process flow with the priority 503 of "high" among the entries in which the identification information of the identified process flow is stored in the process flow ID 501. The process control unit 113 creates a list of the searched process flows.

Processing from Step S302 to Step S305 is processing similar to the processing of Step S202 and Step S205. However, the processing is different in that the target for processing is a process flow with the priority 503 of "high."

While this embodiment performs control so as to execute any of the process transfer processing and the process performance change processing based on the control flag 505, the control is not limited to this. For example, processing as follows may be employed.

The process control unit 113 refers to the process flow configuration information 121 and identifies computers executing the processes 150 constituting the target process flow. The process control unit 113 refers to the process flow load information 123 and calculates the summed value (the loads on the computers) of the process flow loads on the identified computers. Furthermore, the process control unit 113 determines whether or not the loads on all identified computers are a threshold or more. That is, whether the transfer of the process 150 constituting the process flow is possible or not is determined.

When determining that a load on at least one computer is smaller than the threshold among the identified computers, the process control unit 113 executes the process transfer processing.

When determining that the loads on all identified computers are the threshold or more, the process control unit 113 determines whether the loss of data caused by the transfer of the process 150 is permitted or not. When the loss of data caused by the transfer of the process 150 is permitted, the process control unit 113 executes the process transfer processing. When the loss of data caused by the transfer of the process 150 is not permitted, the process control unit 113 notifies the administrator of an error.

Modifications of the low-priority process control processing and the high-priority process control processing have been described above.

Figure 10:
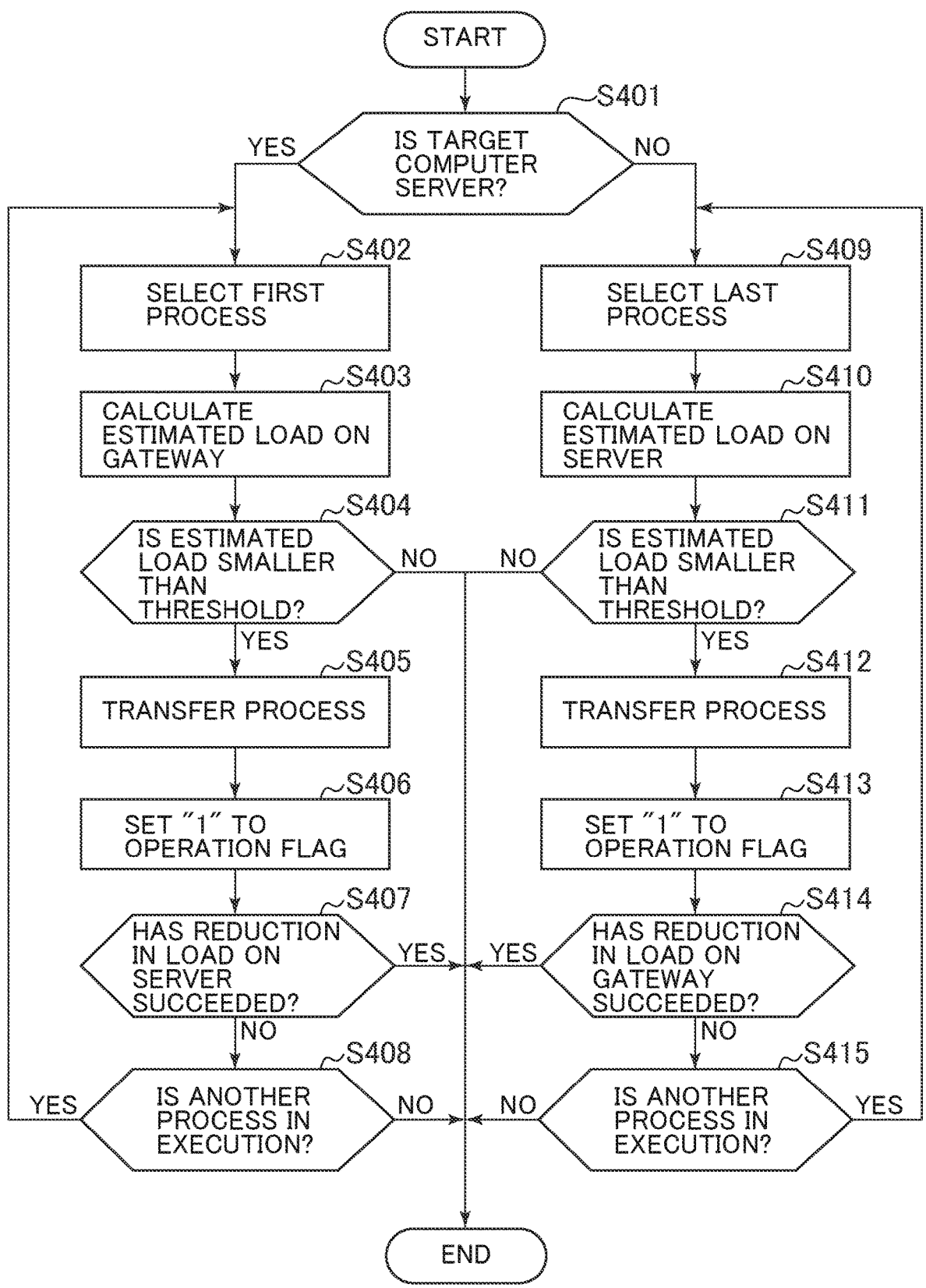
FIG. 10 is a flowchart describing one example of process transfer processing executed by the process control unit of the first embodiment.

FIG. 10 is a flowchart describing one example of the process transfer processing executed by the process control unit 113 of the first embodiment.

The process control unit 113 determines whether the target computer selected at Step S102 is the server 100 or not (Step S401).

When determining that the target computer is the server 100 (YES at Step S401), the process control unit 113 refers to the process flow configuration information 121 and selects the process 150 with the earliest execution order in the target process flow among the processes 150 executed by the server 100 (Step S402).

For example, with the process flow configuration information 121 illustrated in FIG. 5, the process 150 with the identification information "F3" is selected. The reason for performing such control is to maintain the execution orders of the processes 150 constituting the process flow even after transferring the process 150.

Next, the process control unit 113 calculates an estimated load when the selected process 150 is transferred to the gateway 101 that executes the processes 150 constituting the target process flow (Step S403). Specifically, processing like the following is executed.

The process control unit 113 refers to the process flow load information 123 and acquires the process flow load on the server 100 from an entry corresponding to the target process flow. Additionally, the process control unit 113 refers to the process flow load information 123 and calculates the summed value (the load on the gateway 101) of the process flow loads on this gateway 101 based on values in rows corresponding to the transfer destination gateway 101. Here, the load of the process 150 selected as the transfer target is defined as a, and the summed value of the process flow loads on the gateway 101 is defined as σ. The value α can be acquired using a function that monitors the load of every process by the computer. For example, in the case where an OS (Operating System) of the server 100 is Linux (Linux is the registered trademark and the same applies to the following.), the use of a top command and a ps command ensures acquiring the load of every process.

The process control unit 113 refers to the gateway performance information 120 and acquires the performance ratio from the entry corresponding to the gateway 101 that executes the processes 150 constituting the target process flow. The performance ratio acquired here is defined as β.

The process control unit 113 calculates the estimated load on the gateway 101 after transferring the selected process 150 in accordance with the following formula (1). Here, γ represents the estimated load on the gateway 101 after transferring the selected process 150.

[Expression 1]

$$\gamma = \alpha + (\alpha = \beta) \qquad (1)$$

The processing of Step S403 has been described above.

Next, the process control unit 113 determines whether the estimated load on the gateway 101 is smaller than a threshold or not (Step S404). That is, whether the selected process 150 can be transferred to the transfer destination gateway 101 or not is determined. When the estimated load on the gateway 101 is smaller than the threshold, it is determined that the transfer of the process 150 to the gateway 101 is possible.

When determining that the estimated load on the gateway 101 is the threshold or more (NO at Step S404), the process control unit 113 terminates the process transferring processing. At this time, the process control unit 113 outputs a value indicative of a failure of the reduction in the load on the target computer.

When determining that the estimated load on the gateway 101 is smaller than the threshold (YES at Step S404), the process control unit 113 transfers the selected process 150 from the server 100 to the gateway 101 (Step S405). The process control unit 113 sets "1" to the operation flag 504 in an entry corresponding to the target process flow in the process flow requirement information 122 (Step S406). Since the transfer method of the process 150 between the computers is the known technology, the following omits the detailed description. Note that the data processing needs to be temporarily stopped in association with the transfer of the process 150 between the computers.

At this time, the process control unit 113 refers to the process flow configuration information 121 and sets the identification information of the transfer destination gateway 101 to the computer ID 406 in a row corresponding to the selected process 150.

Next, the process control unit 113 determines whether the reduction in the load on the server 100 after transferring the selected process 150 has succeeded or not (Step S407).

For example, the process control unit 113 refers to the process flow load information 123 and determines whether or not the summed value of the process flow loads on the server 100 excluding the process flow load on the target process flow is smaller than the threshold. Alternatively, as another method, the state of the process control unit 113 transitions to a standby state for a certain period after the transfer of the process 150, the summed value of the process flow loads on the server 100 is calculated based on the process flow load information 123 updated during the period, and whether the summed value of the process flow loads is smaller than the threshold or not is determined.

As the result of the above-described determination, in the case where the summed value of the process flow loads on the server 100 is smaller than the threshold, the process control unit 113 determines that the reduction in the load on the server 100 has succeeded.

When determining that the reduction in the load on the server 100 has succeeded (YES as Step S407), the process control unit 113 terminates the process transfer processing. At this time, the process control unit 113 outputs a value indicative of a success of the reduction in the load on the target computer.

When determining that the reduction in the load on the server 100 has failed (NO at Step S407), the process control unit 113 refers to the process flow configuration information 121 and determines whether the server 100 executes another process 150 constituting the target process flow or not (Step S408).

When determining that the server 100 executes the other process 150 constituting the target process flow (YES at Step S408), the process control unit 113 returns processing to Step S402 and executes the similar processing.

When determining that the server 100 does not execute the other process 150 constituting the target process flow (NO at Step S408), the process control unit 113 terminates the process transfer processing. At this time, the process control unit 113 outputs a value indicative of a failure of the reduction in the load on the target computer.

At Step S401, When determining that the target computer is the gateway 101 (NO at Step S401), the process control unit 113 refers to the process flow configuration information 121 and selects the last process 150 in the execution order in the target process flow among the processes 150 executed by the gateway 101 (Step S409).

For example, with the process flow configuration information 121 illustrated in FIG. 5, the process 150 with the identification information "F1" is selected. The reason for performing such control is to maintain the execution orders of the processes 150 constituting the process flow even after transferring the process 150.

Next, the process control unit 113 calculates an estimated load when the selected process 150 is transferred to the server 100 that executes the processes 150 constituting the target process flow (Step S410). Specifically, processing like the following is executed.

The process control unit 113 refers to the process flow load information 123 and acquires the process flow load on the gateway 101 from an entry corresponding to the target process flow. Additionally, the process control unit 113 refers to the process flow load information 123 and calculates the summed value (the load on the server 100) of the process flow loads on this server 100 based on values in rows corresponding to the transfer destination server 100. Here, the load on the process 150 selected as the transfer target is defined as $\alpha'$, and the summed value of the process flow loads on the server 100 is defined as $\sigma'$. The value $\alpha'$ can be acquired using a function that monitors the load of every process by the computer similar to the above-described $\alpha$.

The process control unit 113 refers to the gateway performance information 120 and acquires the performance ratio from the entry corresponding to the gateway 101 that executes the selected process 150. The performance ratio acquired here is defined as $\beta'$.

The process control unit 113 calculates the estimated load on the server 100 after transferring the selected process 150 in accordance with the following formula (2). Here, $\gamma'$ represents the estimated load on the server 100 after transferring the selected process 150.

[Expression 2]

$$\gamma' = \alpha' + (\alpha' \times \beta') \qquad (2)$$

The processing of Step S410 has been described above.

Next, the process control unit 113 determines whether the estimated load on the server 100 is smaller than a threshold or not (Step S411). That is, whether the selected process 150 can be transferred to the server 100 or not is determined. When the estimated load on the server 100 is smaller than the threshold, it is determined that the transfer of the process 150 to the server 100 is possible.

When determining that the estimated load on the server 100 is the threshold or more (NO at Step S411), the process control unit 113 terminates the process transfer processing. At this time, the process control unit 113 outputs a value indicative of a failure of the reduction in the load on the target computer.

When determining that the estimated load on the server 100 is smaller than the threshold (YES at Step S411), the process control unit 113 transfers the selected process 150 from the gateway 101 to the server 100 (Step S412). The process control unit 113 sets "1" to the operation flag 504 in an entry corresponding to the target process flow in the process flow requirement information 122 (Step S413). Since the transfer method of the process 150 between the computers is the known technology, the following omits the detailed description.

At this time, the process control unit 113 refers to the process flow configuration information 121 and sets the identification information of the server 100 to the computer ID 406 in a row corresponding to the selected process 150.

Next, the process control unit 113 determines whether the reduction in the load on the gateway 101 after transferring the selected process 150 has succeeded or not (Step S414). The determination method of Step S414 is similar to that of Step S407.

When determining that the reduction in the load on the gateway 101 has succeeded (YES as Step S414), the process control unit 113 terminates the process transfer processing. At this time, the process control unit 113 outputs a value indicative of a success of the reduction in the load on the target computer.

When determining that the reduction in the load on the gateway 101 has failed (NO at Step S414), the process control unit 113 refers to the process flow configuration information 121 and determines whether the gateway 101 executes another process 150 constituting the target process flow or not (Step S415).

When determining that the gateway 101 executes the other process 150 constituting the target process flow (YES at Step S415), the process control unit 113 returns processing to Step S409 and executes the similar processing.

When determining that the gateway 101 does not execute the other process 150 constituting the target process flow (NO at Step S415), the process control unit 113 terminates the process transfer processing. At this time, the process control unit 113 outputs a value indicative of a failure of the reduction in the load on the target computer.

Figure 11:
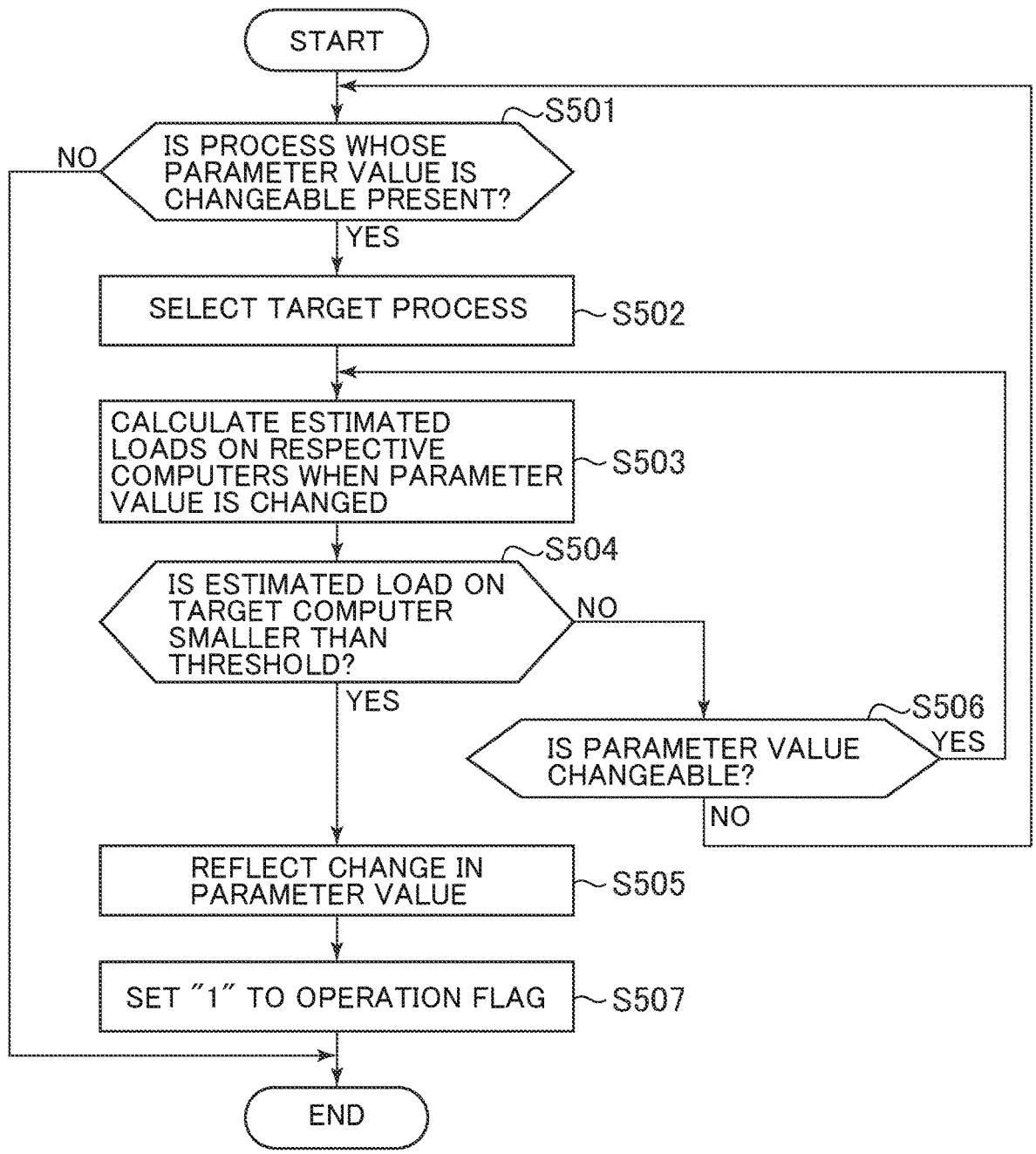
FIG. 11 is a flowchart describing one example of process performance change processing executed by the process control unit of the first embodiment.

FIG. 11 is a flowchart describing one example of the process performance change processing executed by the process control unit 113 of the first embodiment.

The process control unit 113 refers to the process flow configuration information 121 and determines whether the process 150 whose parameter value is changeable is present or not among the processes 150 constituting the target process flow (Step S501).

Specifically, the process control unit 113 refers to an entry in which the process flow ID 401 matches the identification information of the target process flow and determines whether a row in which a value is set is present in the parameter 404 or not. The process 150 corresponding to this row corresponds to the process 150 whose parameter value is changeable.

When the process 150 whose parameter value is changeable is present, the process control unit 113 creates a list of these processes 150.

When determining that the process 150 whose parameter value is changeable is absent among the processes 150 constituting the target process flow (NO at Step S501), the process control unit 113 terminates the process performance change processing. At this time, the process control unit 113 outputs a value indicative of a failure of the reduction in the load on the target computer.

When determining that the process 150 whose parameter value is changeable is present among the processes 150 constituting the target process flow (YES at Step S501), the process control unit 113 selects the target process 150 among the searched processes 150 (Step S502).

Specifically, the process control unit 113 selects the target process 150 from the list created at Step S501. At this time, the process control unit 113 deletes the target process 150 from the list. Moreover, the process control unit 113 creates a copy of the parameter 404 in a row corresponding to the target process 150 as first simulation data and creates a copy of the process flow load information 123 as second simulation data.

As the selection method of the target process 150, a method of selection based on the execution orders of the processes 150, a method of selecting the process 150 based on an order of a height of the load on the computer, a method of selecting the process 150 executed by the computer under the highest load, and a similar method are considered.

Next, the process control unit 113 calculates the estimated loads on the respective computers when the parameter value of the target process 150 is changed (Step S503). Specifically, processing like the following is executed.

The process control unit 113 changes the setting value of the first simulation data to a value decreased by one level based on the pitch width. Furthermore, the process control unit 113 calculates estimated process flow loads on the respective computers based on a calculation formula related to this parameter.

The process control unit 113 sets the estimated process flow loads to the load information 602 of the second simulation data. The process control unit 113 refers to the second simulation data and calculates the summed value (the estimated load on the computers) of the process flow loads on the respective computers.

Here, as one example, assume the case that the target process 150 is the filtering. In the case where the number of extracted data is changed from "5" to "4," the number of data handled by the processes 150 whose execution orders are later than that of the target process 150 is also reduced. In this case, the process control unit 113 calculates 4/5 of the loads (the process flow loads) of the target process 150 and the processes 150 whose execution orders are later than that of the target process 150 as the estimated process flow load.

The above-described calculation method is one example and the method is not limited to this. The calculation formula according to the type of the process 150 and the change contents of the parameter can be set. The processing of Step S503 has been described above.

Next, the process control unit 113 determines whether the estimated load on the target computer is smaller than a threshold or not (Step S504).

When determining that the estimated load on the target computer is smaller than the threshold (YES at Step S504), the process control unit 113 reflects the change result of the parameter value at Step S503 to the actual process 150 (Step S505). The process control unit 113 sets "1" to the operation flag 504 in an entry corresponding to the target process flow in the process flow requirement information 122 (Step S507). Afterwards, the process control unit 113 terminates the process performance change processing. At this time, the process control unit 113 outputs a value indicative of a success of the reduction in the load on the target computer. The data processing needs not to be stopped in association with the parameter change.

Specifically, the process control unit 113 transmits a change request including the first simulation data as the change contents of the parameter value to the computer executing the target process 150. The process control unit 113 updates the parameter 404 in a row in the process flow configuration information 121 searched at Step S501 based on the first simulation data.

When determining that the estimated load on the target computer is the threshold or more at Step S504 (NO at Step S504), the process control unit 113 determines whether the parameter of the target process 150 can be additionally changed or not (Step S506).

Specifically, the process control unit 113 determines whether a setting value of the first simulation data matches the minimum value or not. When the setting value matches the minimum value, the process control unit 113 determines that the parameter of the target process 150 is not changeable.

When determining that the parameter of the target process 150 is changeable (YES at Step S506), the process control unit 113 returns processing to Step S503 and executes the similar processing.

When determining that the parameter of the target process 150 is not changeable (NO at Step S506), the process control unit 113 returns processing to Step S501 and executes the similar processing. At Step S501, the process control unit 113 determines whether the list is blank or not to determine whether the process 150 whose parameter is changeable is present or not.

As described with reference to FIG. 8 to FIG. 11, when any of the loads on the server 100 and the gateway 101 constituting the data processing system 1 becomes high, the server 100 executes any of the transfer of the process 150 or the parameter change of the process 150 based on the process flow load and the attribute of the process flow. Accordingly, a state where a load on a specific computer is high is avoidable.

Figure 12:
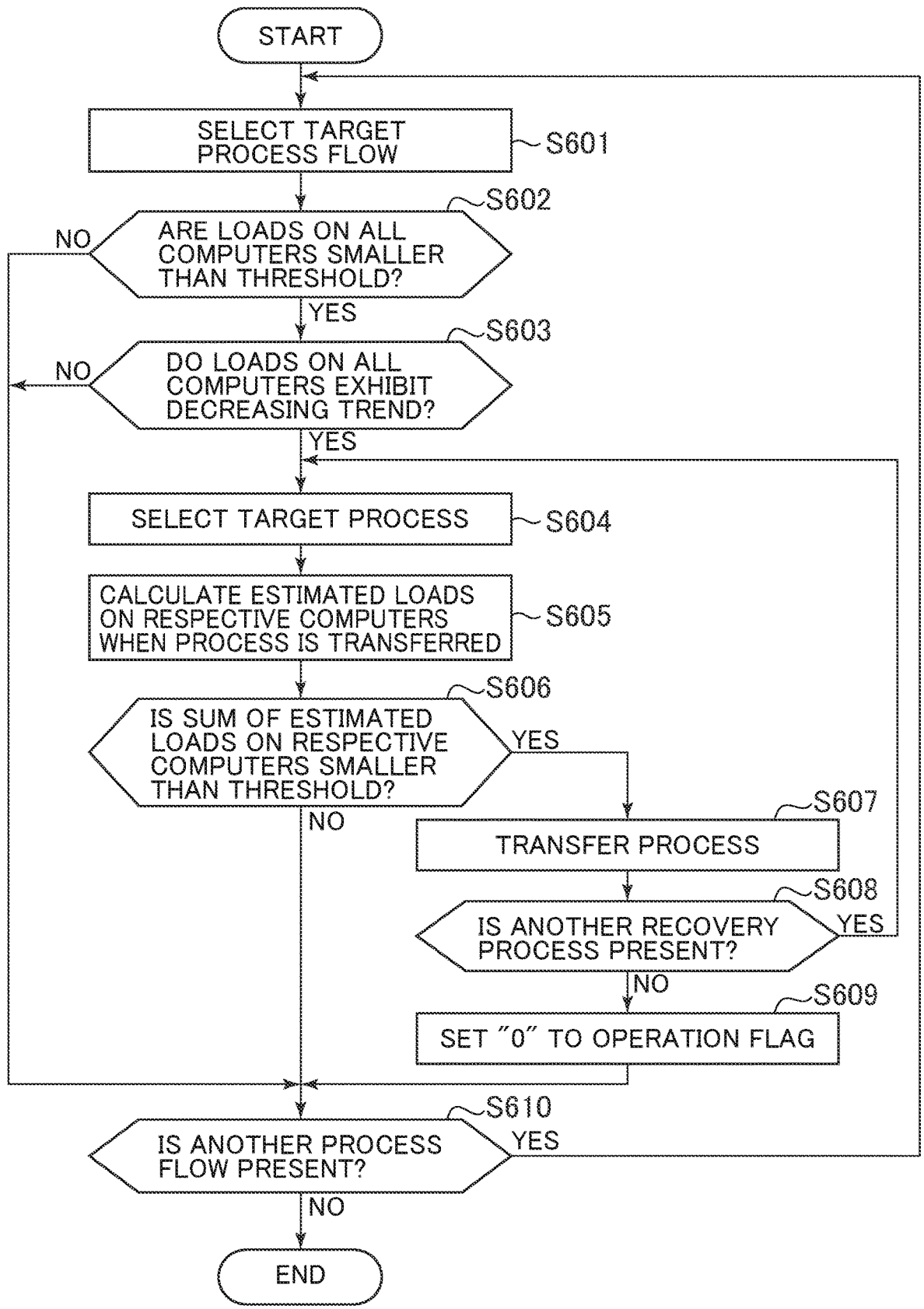
FIG. 12 is a flowchart describing one example of process position recovery processing executed by the process control unit of the first embodiment.

FIG. 12 is a flowchart describing one example of process position recovery processing executed by the process control unit 113 of the first embodiment.

The process position recovery processing is processing to return the processes 150 transferred by the process transfer processing to positions before the change as much as possible.

Periodically or when accepting an instruction from the administrator, the process control unit 113 executes the process position recovery processing described later.

The process control unit 113 selects a target process flow among the process flows (Step S601). Specifically, processing like the following is executed.

The process control unit 113 refers to the process flow requirement information 122 and identifies a process flow with the operation flag 504 of "1." Furthermore, the process control unit 113 refers to the process flow configuration information 121 and searches an entry including a row of the identified process flow where values of the initial computer ID 405 and the computer ID 406 are different. The process control unit 113 creates a list of the searched process flows.

The process control unit 113 selects a target process from the list. At this time, the process control unit 113 deletes the target process flow from the list. The process control unit 113 refers to the process flow configuration information 121 and creates a list of the processes 150 constituting the target process flow and the processes 150 where the values of the initial computer ID 405 and the computer ID 406 are different. That is, the list of the transferred processes 150 is created.

In the following description, the process 150 registered with the list of the processes 150 is also referred to as the recovery process 150. The processing of Step S601 has been described above.

Next, the process control unit 113 refers to the process flow load information 123 and determines whether the loads on all computers executing the processes 150 constituting the target process flow are smaller than a threshold or not (Step S602).

When determining that a load on at least one computer executing the process 150 constituting the target process flow is the threshold or more (NO at Step S602), since the recovery process 150 cannot be transferred, the process control unit 113 advances processing to Step S610.

When determining that the loads on all computers that execute the processes 150 constituting the target process flow are smaller than the threshold (YES at Step S602), the process control unit 113 determines whether the loads on all computers exhibit a decreasing trend or not (Step S603).

Specifically, the process control unit 113 refers to the load variation information 603 in an entry corresponding to the target process flow in the process flow load information 123. The process control unit 113 determines whether statistics of the respective computers are smaller than a threshold or not. For example, the process control unit 113 determines whether the value of the load variation information 603 is smaller than "0" or not.

When determining that a load on at least one computer does not exhibit the decreasing trend (NO at Step S603), since the recovery process 150 cannot be transferred, the process control unit 113 advances processing to Step S610.

When determining that the loads on all computers exhibit the decreasing trend (YES at Step S603), the process control unit 113 selects the target process 150 among the recovery processes 150 (Step S604).

At this time, the process control unit 113 deletes the target process 150 from the list of the recovery processes 150 created at Step S601.

Next, the process control unit 113 calculates estimated loads on the respective computers when the target process 150 is transferred to the computer before the transfer (Step S605). The processing of Step S605 is processing similar to the processing of Step S403 or Step S409.

Next, the process control unit 113 determines whether the estimated loads on the respective computers are smaller than the threshold or not (Step S606).

When determining that an estimated load on at least one computer is the threshold or more (NO at Step S606), since the recovery process 150 cannot be transferred, the process control unit 113 advances processing to Step S610.

When determining that the estimated loads on the respective computers are smaller than the threshold (YES at Step S606), the process control unit 113 transfers the target process 150 to the original computer (Step S607).

At this time, the process control unit 113 refers to the process flow configuration information 121 and sets the value of the initial computer ID 405 to the computer ID 406 in the row corresponding to the target process 150.

Next, the process control unit 113 determines whether the unprocessed recovery process 150 is present or not (Step S608).

Specifically, the process control unit 113 determines whether the list of the recovery processes 150 created at Step S601 is blank or not. When the list of the recovery processes 150 is blank, the process control unit 113 determines that the unprocessed recovery process 150 is absent.

When determining that the unprocessed recovery process 150 is present (YES at Step S608), the process control unit 113 returns processing to Step S604 and executes the similar processing.

When determining that the unprocessed recovery process 150 is absent (NO at Step S608), the process control unit 113 refers to the process flow requirement information 122 and sets "0" to the operation flag 504 in the entry corresponding to the target process flow (Step S609). Afterwards, the process control unit 113 advances processing to Step S610.

At Step S610, the process control unit 113 determines whether the unprocessed process flow is present or not (Step S610).

Specifically, the process control unit 113 determines whether the list of the process flows created at Step S601 is blank or not. When determining that the list of the process flows is blank, the process control unit 113 determines that the unprocessed process flow is absent.

When determining that the unprocessed process flow is absent (NO at Step S610), the process control unit 113 terminates the process position recovery processing.

When determining that the unprocessed process flow is present (YES at Step S610), the process control unit 113 returns processing to Step S601 and executes the similar processing.

The execution of the process position recovery processing allows the position of the process 150 to be returned to the original position in association with the reduction in the load.

Figure 13:
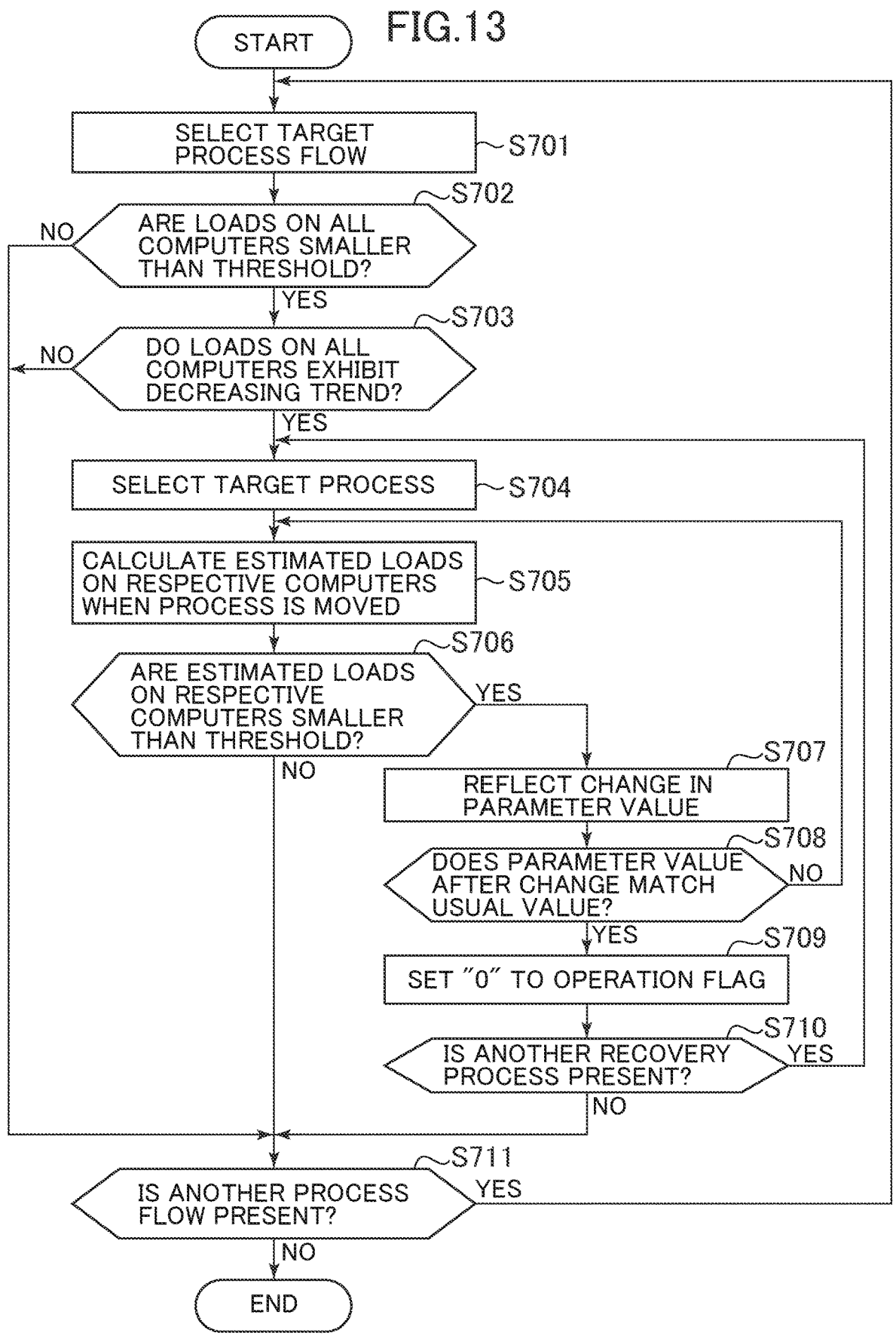
FIG. 13 is a flowchart describing one example of parameter recovery processing executed by the process control unit of the first embodiment.

FIG. 13 is a flowchart describing one example of parameter recovery processing executed by the process control unit 113 of the first embodiment.

The parameter recovery processing is processing to return the parameter values changed by the process performance change processing to the values before the change as much as possible.

Periodically, or when accepting an instruction from an administrator, the process control unit 113 executes the recovery processing described below.

The process control unit 113 selects a target process flow among the process flows (Step S701). Specifically, processing like the following is executed.

The process control unit 113 refers to the process flow requirement information 122 and identifies a process flow with the operation flag 504 of "1." Furthermore, the process control unit 113 refers to the process flow configuration information 121 and searches an entry including a row of a process in which the usual value and the setting value are different. The process control unit 113 creates a list of the searched process flows.

The process control unit 113 selects the target process from the list. At this time, the process control unit 113 deletes the target process flow from the list. The process control unit 113 refers to the process flow configuration information 121 and creates the list of the processes 150 constituting the target process flow and the processes 150 in which the setting value and the usual value are different. That is, the list of the processes 150 whose parameter values have been changed by the process performance change processing is created.

In the following description, the processes 150 registered with the list of the processes 150 are also referred to as the recovery processes 150. The processing of S701 has been described above.

Next, the process control unit 113 refers to the process flow load information 123 and determines whether loads on all computers executing the processes 150 constituting the target process flow are smaller than a threshold or not (Step S702). The processing of Step S702 is similar to the processing of Step S602.

When determining that a load on at least one computer that executes the process 150 constituting the target process flow is the threshold or more (NO at Step S702), since the parameter value of the recovery process 150 cannot be changed, the process control unit 113 advances the processing to Step S711.

When determining that the loads on all computers that execute the processes 150 constituting the target process flow are smaller than the threshold (YES at Step S702), the process control unit 113 determines whether the loads on all computers exhibit a decreasing trend or not (Step S703). The processing of Step S703 is similar to the processing of Step S603.

When determining that a load on at least one computer does not exhibit the decreasing trend (NO Step S703), since the parameter value of the recovery process 150 cannot be changed, the process control unit 113 advances processing to Step S711.

When determining that the loads on all computers exhibit the decreasing trend (YES at Step S703), the process control unit 113 selects the target process 150 among the recovery processes 150 (Step S704).

At this time, the process control unit 113 deletes the target process 150 from the list of the recovery processes 150. Further, the process control unit 113 refers to the process flow configuration information 121 and creates a copy of the parameter 404 in a row corresponding to the target process 150 as third simulation data.

Next, the process control unit 113 calculates the estimated loads on the respective computers when the parameter value of the target process 150 is changed (Step S705). The processing of Step S705 is processing similar to processing of Step S503. Note that, at Step S705, the process control unit 113 changes a setting value of the simulation data to a value increased by one level based on the pitch width.

Next, the process control unit 113 determines whether the estimated loads on the respective computers are smaller than a threshold or not (Step S706).

When determining that an estimated load on at least one computer is the threshold or more (NO at Step 706), since the parameter value of the recovery process 150 cannot be changed, the process control unit 113 advances processing to Step S711.

When determining that the estimated loads on the respective computers are smaller than the threshold (YES at Step S706), the process control unit 113 reflects the change result of the parameter value at Step S705 to the actual process 150 (Step S707).

Specifically, the process control unit 113 transmits a change request including the third simulation data as the change contents of the parameter value to the computer that executes the target process 150. At this time, the process control unit 113 updates the parameter 404 in the row in the process flow configuration information 121 searched at Step S703 based on the third simulation data.

Next, the process control unit 113 determines whether the parameter value after the change matches the usual value or not (Step S708).

Specifically, the process control unit 113 refers to the parameter 404 in the row corresponding to the target process 150 in the process flow configuration information 121 and determines whether the setting value matches the usual value or not.

When determining that the parameter value after the change does not match the usual value (NO at Step S708), the process control unit 113 returns processing to Step S705 and executes the similar processing.

When determining that the parameter value after the change matches the usual value (YES at Step S708), the process control unit 113 refers to the process flow requirement information 122 and sets "0" to the operation flag 504 in the entry corresponding to the target process flow (Step S709).

Next, the process control unit 113 determines whether the unprocessed recovery process 150 is present or not (Step S710).

Specifically, the process control unit 113 determines whether the list of the recovery processes 150 created at Step S701 is blank or not. When the list of the recovery processes 150 is blank, the process control unit 113 determines that the unprocessed recovery process 150 is absent.

When determining that the unprocessed recovery process 150 is present (YES at Step S710), the process control unit 113 returns processing to Step S704 and executes the similar processing.

When determining that the unprocessed recovery process 150 is absent (NO at Step S710), the process control unit 113 advances processing to Step S711.

At Step S711, the process control unit 113 determines whether the unprocessed process flow is present or not (Step S711).

Specifically, the process control unit 113 determines whether the list of the process flows created at Step S701 is blank or not. When determining that the list of the process flows is blank, the process control unit 113 determines that the unprocessed process flow is absent.

When determining that the unprocessed process flow is absent (NO at Step S711), the process control unit 113 terminates the parameter recovery processing.

When determining that the unprocessed process flow is present (YES at Step S711), the process control unit 113 returns processing to Step S701 and executes the similar processing.

The execution of the parameter recovery processing allows the performance of the process flow to be returned to the original performance in stages in association with the reduction in the load.

As described above, with this embodiment, the execution of any of the change in the performance and the change in the position of the process 150 constituting the process flow allows reducing the load on the specific computer in association with the execution of the process 150. This allows continuing the data processing.

Since the control method of this embodiment eliminates the need for adding a resource required for data processing, an effect of ensuring saving an operation cost is also provided.

The present invention is not limited to the above-described embodiment and includes various modifications. For example, the configurations of the embodiment described above have been described in detail in order to facilitate the understanding of the present invention, and the present invention is not limited to those having all configurations described above. Some of the configurations of each embodiment can be added to, deleted from, or replaced by other configurations.

The above-described respective configurations, functions, processing units, processing means, or similar specifications may be achieved by hardware, for example, a part of or all of which are designed with, for example, an integrated circuit. The present invention can be achieved by a program code of software achieving the functions of the embodiment. In this case, a storage medium recording the program code is provided to a computer device, and a processor that the computer device includes reads out the program code stored in the storage medium. In this case, the program codes themselves read from the storage medium achieve the above-described functions of the embodiment, and the present invention includes the program codes themselves and the storage medium storing the program codes. As the storage medium supplying such program codes, for example, a flexible disk, a CD-ROM, a DVD-ROM, a hard disk, an SSD (Solid State Drive), an optical disk, a magneto-optical disk, a CD-R, a magnetic tape, a non-volatile memory card, and a ROM are used.

Additionally, the program code achieving the functions described in this embodiment can be implemented by wide-range programs or script languages such as an assembler, C/C++, perl, Shell, PHP, and Java.

Furthermore, the program codes of the software achieving the functions of the embodiment may be delivered over a network and stored in storage means such as a hard disk and a memory in the computer device or the storage medium such as a CD-RW and a CD-R, and the processor provided with the computer device may read and execute the program code stored in this storage means and this storage medium.

In the above-described embodiment, control lines and information lines considered necessary for the explanation are described. All of the control lines and the information lines of the product are not necessarily described. All configurations may be mutually coupled.

LIST OF REFERENCE SIGNS

1 data processing system
100 server
101 gateway
102 sensor
103 work computer
105 network
110, 130 load monitoring unit
111, 131 sorting unit
112, 132 process flow processing unit
113 process control unit
120 gateway performance information
121 process flow configuration information
122 process flow requirement information
123 process flow load information
150 process
200, 210 arithmetic device
201, 211 storage device
202, 212 interface

The invention claimed is:

1. A computer system that executes data processing using collected data,
wherein the computer system is configured to execute a plurality of data processing operations,
wherein, to the plurality of data processing operations, priorities indicative of importance levels of the data processing operations are set,
wherein the computer system includes a gateway configured to collect the data and a server coupled to the gateway,
the data processing operations include a plurality of processes,
the gateway and the server are each configured to execute at least one process,
the server is configured to:
manage an attribute of the data processing;
monitor loads on the gateway and the server in association with the execution of the data processing;
determine from the monitoring loads that a usage rate of the gateway or a usage rate of the server is above a predefined threshold;
select the gateway or the server as a target computer for a reduction in the load based on monitoring results of the loads;
select target data processing among the data processing operations including the processes executed by the target computer in order from the data processing operation to which a priority of lower importance has been set to the data processing operation to which a priority of higher importance has been set; and execute process control processing to reduce the loads associated with the execution of the data processing based on the attribute of the data processing and the monitoring results of the loads, wherein the process control processing includes transfer processing to transfer the process between the target computer and a computer different from the target computer and performance change processing to change a parameter configured to control performance of the process, and during the performance change processing, the server is configured to change parameter in stages at a predetermined pitch width such that the loads on the gateway and the server are decreased and performance of at least one process among the plurality of processes is reduced.

2. The computer system according to claim 1, wherein the attribute of the data processing includes a value indicative of whether to permit a loss of the data or not, and the server is further configured to:

determine whether the loss of data is permitted in the target data processing or not;

execute the transfer processing on at least one process among the plurality of processes constituting the target data processing when the loss of data is determined to be permitted in the target data processing; and execute the performance change processing on at least one process among the plurality of processes constituting the target data processing when the loss of data is determined not to be permitted in the target data processing.

3. The computer system according to claim 2, wherein when the respective loads on the gateway and the server executing the plurality of processes constituting the target data processing are smaller than a threshold and exhibit a decreasing trend, the server returns the parameter of the process on which the performance change processing has been executed to an original parameter in stages at the predetermined pitch width.

4. The computer system according to claim 2, wherein when the respective loads on the gateway and the server executing the plurality of processes constituting the target data processing are smaller than a threshold and exhibit a decreasing trend, the process on which the transfer processing has been executed is transferred to the target computer.

5. A method of controlling data processing executed by a computer system, the computer system including a gateway and a server, the gateway being configured to collect data, the server being coupled to the gateway, wherein the data processing includes a plurality of processes that process the collected data, wherein the computer system is configured to execute a plurality of the data processing operations to which priorities indicative of importance levels of the data processing are set, the gateway and the server are each configured to execute at least one process, the method comprising:

managing an attribute of the data processing by the server;

monitoring loads on the gateway and the server in association with the execution of the data processing by the server; and executing process control processing to reduce the loads in association with the execution of the data processing based on the attribute of the data processing and monitoring results of the loads by the server, wherein the process control processing includes:

selecting the gateway or the server as a target computer as a target for the reduction in the load based on the monitoring results of the loads by the server, selecting target data processing among the data processing operations in order from the data processing operation to which a priority of lower importance has been set to the data processing operation to which a priority of higher importance has been set by the server including the processes executed by the target computer, executing transfer processing including transferring the process executed by the target computer to a computer different from the target computer by the server, and executing performance change processing including changing a parameter configured to control performance of the process, the parameter changed by the server in stages at a predetermined pitch width such that the loads on the gateway and the server are decreased and performance of at least one process of the plurality of processes is reduced.

6. The method of controlling data processing according to claim 5, the attribute of the data processing includes a value indicative of whether to permit a loss of the data or not, and executing process control processing includes:

determining whether the loss of data is permitted in the target data processing or not by the server;

executing the transfer processing on at least one process among the plurality of processes constituting the target data processing by the server when the loss of data is determined to be permitted in the target data processing; and executing the performance change processing on at least one process among the plurality of processes constituting the target data processing by the server when the loss of data is determined not to be permitted in the target data processing.

7. The method of controlling data processing according to claim 6, further comprising returning the parameter of the process on which the performance change processing has been executed to an original parameter in stages at the predetermined pitch width by the server when the respective loads on the gateway and the server executing the plurality of processes constituting the target data processing are smaller than a threshold and exhibit a decreasing trend.

8. The method of controlling data processing according to claim 6, further comprising transferring the process on which the transfer processing has been executed to the target computer by the server when the respective loads on the gateway and the server executing the plurality of processes constituting the target data processing are smaller than a threshold and exhibit a decreasing trend.

9. The computer system according to claim 1, wherein the process control processing further includes process position recovery processing to return a process flow position of the process transferred by the process transfer processing to an original process flow position.

10. The computer system according to claim 1, wherein the process control processing further includes parameter recovery processing to return performance of the at least one process to an original performance in stages according to reduction in the loads on the server and the gateway.

11. The computer system according to claim 5, wherein the process control processing further includes process position recovery processing to return a process flow position of the process transferred by the process transfer processing to an original process flow position.

12. The computer system according to claim 5, wherein the process control processing further includes parameter recovery processing to return performance of the at least one process to an original performance in stages according to reduction in the loads on the server and the gateway.

* * * * *